US009628953B2

(12) United States Patent
Davydov et al.

(10) Patent No.: US 9,628,953 B2
(45) Date of Patent: Apr. 18, 2017

(54) APPARATUS, COMPUTER-READABLE MEDIUM, AND METHOD TO DETERMINE A USER EQUIPMENT LOCATION IN A CELLULAR NETWORK USING SIGNALS FROM A WIRELESS LOCAL AREA NETWORK (WLAN)

(71) Applicant: Intel Corporation, Santa Clara, CA (US)

(72) Inventors: Alexei Davydov, Nizhny Novgorod (RU); Jong-Kae Fwu, Sunnyvale, CA (US); Gregory Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/669,243

(22) Filed: Mar. 26, 2015

(65) Prior Publication Data

US 2016/0037301 A1 Feb. 4, 2016

Related U.S. Application Data

(60) Provisional application No. 62/031,691, filed on Jul. 31, 2014.

(51) Int. Cl.
*H04M 11/04* (2006.01)
*H04W 24/00* (2009.01)
(Continued)

(52) U.S. Cl.
CPC .......... *H04W 4/023* (2013.01); *H04W 4/021* (2013.01); *H04W 4/22* (2013.01)

(58) Field of Classification Search
None
See application file for complete search history.

(56) References Cited

U.S. PATENT DOCUMENTS

2008/0130604 A1 6/2008 Boyd
2011/0257923 A1 10/2011 Boulton
(Continued)

FOREIGN PATENT DOCUMENTS

WO WO-2012111950 A2 8/2012
WO WO-2016018512 A1 2/2016

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 12)", 3GPP TS 36.355 V12.2.0, (Jun. 2014), 126 pgs.
(Continued)

*Primary Examiner* — Erika Washington
(74) *Attorney, Agent, or Firm* — Schwegman Lundberg & Woessner, P.A.

(57) ABSTRACT

An apparatus, computer-readable medium, and method to determine a user equipment (UE) location in a wireless network using signals from a wireless local-area network are disclosed. A wireless communication network entity may be configured to send WLAN assistance data to a UE. The WLAN assistance data may include a list of one or more WLAN access points (APs). The wireless communication network entity may receive location information from the UE. The location information may be based on measurements of signals from one or more of the WLAN APs. The wireless communication network entity may determine an estimate of the location of the UE based on the location information and stored information at the wireless communication network. The wireless communication network entity may determine the estimate of the location of the UE based on the measurements of the signals of the WLAN APs and a geographic position of the WLAN APs.

22 Claims, 9 Drawing Sheets

(51) Int. Cl.
    *H04W 4/02*         (2009.01)
    *H04W 4/22*         (2009.01)

(56) References Cited

U.S. PATENT DOCUMENTS

| | | | | |
|---|---|---|---|---|
| 2012/0136623 | A1* | 5/2012 | Edge | G01S 5/0284 |
| | | | | 702/150 |
| 2013/0003572 | A1 | 1/2013 | Kim et al. | |
| 2013/0100819 | A1 | 4/2013 | Anchan et al. | |
| 2014/0235266 | A1* | 8/2014 | Edge | H04W 64/00 |
| | | | | 455/456.1 |
| 2014/0286326 | A1* | 9/2014 | Jang | H04W 4/02 |
| | | | | 370/338 |
| 2015/0181552 | A1* | 6/2015 | Bajko | H04W 64/00 |
| | | | | 455/456.2 |

OTHER PUBLICATIONS

"3rd Generation Partnership Project; Technical Specification Group Radio Access Network; Evolved Universal Terrestrial Radio Access (E-UTRA); Physical layer; Measurements (Release 11)", 3GPP TS 36.214 V11.1.0, (Dec. 2012), 14 pgs.

"International Application Serial No. PCT/US2015/035075, International Search Report mailed Sep. 22, 2015", 3 pgs.

"International Application Serial No. PCT/US2015/035075, Written Opinion mailed Sep. 22, 2015", 10 pgs.

* cited by examiner

602 — SEND UE LOCATION CAPABILITES

604 — RECEIVE WLAN ASSISTANCE DATA

606 — DETERMINE LOCATION INFORMATION

608 — SEND LOCATION INFORMATION

APPARATUS, COMPUTER-READABLE MEDIUM, AND METHOD TO DETERMINE A USER EQUIPMENT LOCATION IN A CELLULAR NETWORK USING SIGNALS FROM A WIRELESS LOCAL AREA NETWORK (WLAN)

PRIORITY CLAIM

This application claims the benefit of priority under 35 USC 119(e) to U.S. Provisional Patent Application Ser. No. 62/031,691, filed Jul. 31, 2014, which is incorporated herein by reference in its entirety.

TECHNICAL FIELD

Some embodiments relate to determining a location of user equipment (UE) based on signals from wireless local area network (WLAN) access point (AP) that a UE in a 3rd Generation Partnership Project (3GPP) network may receive. Some embodiments relate to determining a location of the UE based on signals from both one or more APs and one or more base stations or Evolved NodeB (eNBs). Some embodiments relate to determining a location of the UE based on signals from one or more APs, one or more eNBs, and/or one or more satellites.

BACKGROUND

The Federal Communication Commission (FCC) requires all mobile operators in the United States of America to comply with the following E911 location requirements for outdoor locations: 67% emergency calls should be located with 50 meter (m) accuracy and 80% of the emergency calls should be located with 150 m accuracy (this will rise to 90% in several years).

The FCC is now proposing to extend current E911 requirements for indoor locations where satellite signals often cannot be received. In addition, the FCC is proposing that 67% of emergency calls should be located with a 3 m accuracy for a vertical location (z-axis) for indoor locations, and the 67% may rise to 80% in the next several years. Current solutions may not provide the required level of accuracy.

Therefore, there is a need in the art for apparatuses, computer readable media, and methods for determining the location of a UE.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
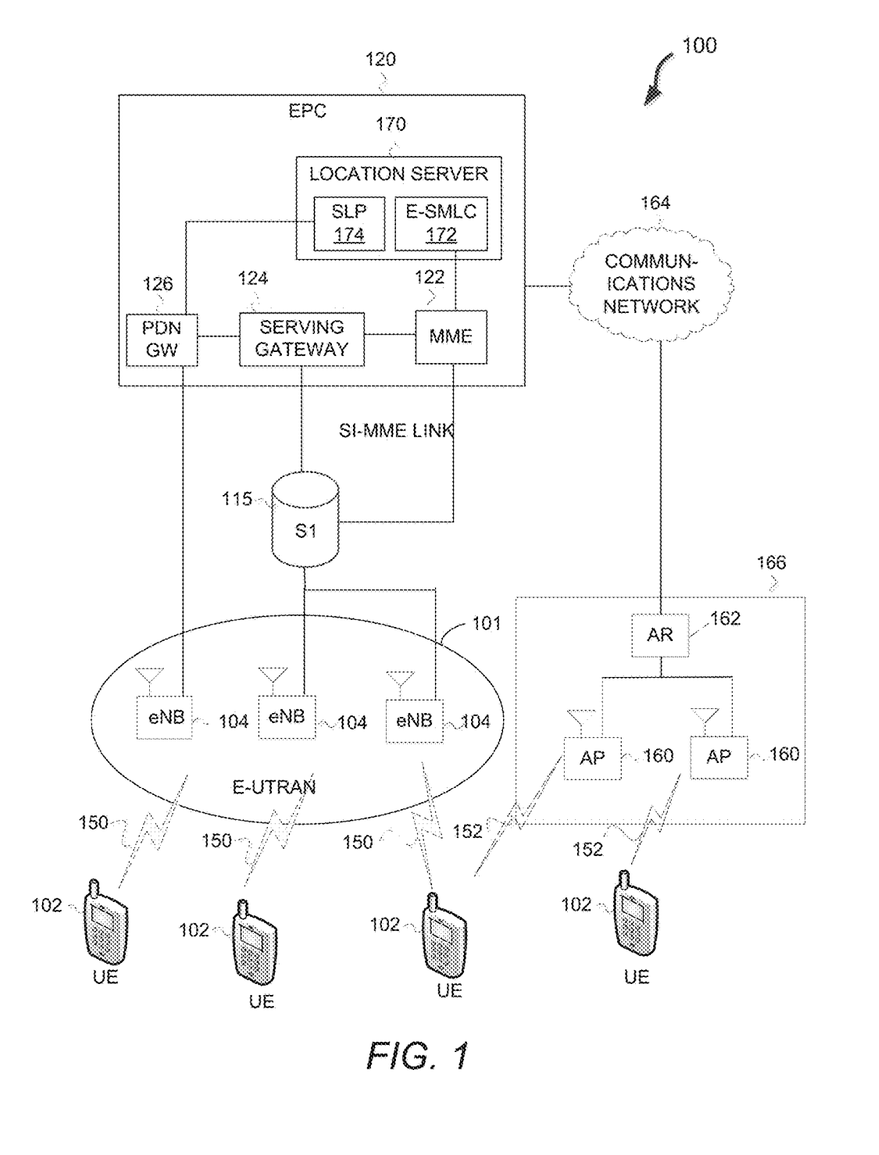
FIG. 1 illustrates a portion of an end-to-end network architecture of a long-term evolution (LTE) network and WLAN with various components of the network according to example embodiments.

FIG. 1 shows a portion of an end-to-end network architecture of an LTE network and WLAN with various components of the network 100 in accordance with some embodiments.

The network comprises a radio access network (RAN) 101 (e.g., as depicted, the evolved universal terrestrial radio access network (E-UTRAN)) and the core network 120 (e.g., shown as an evolved packet core (EPC)) coupled together through an S1 interface 115. For convenience and brevity's sake, only a portion of the core network 120, as well as the RAN 101, is shown.

The core network 120 includes mobility management entity (MME) 122, serving gateway (serving GW) 124, location server 170, and packet data network gateway (PDN GW) 126.

The RAN 101 includes eNBs 104 (which may operate as base stations) for communicating a UE 102. The eNBs 104 may include (macro) eNBs and low power (LP) eNBs. The eNBs 104 are transmitting eNB signals 150. The UE 102 may transmit a physical uplink control channel (PUCCH), which may include a channel status information (CSI) report that provides feedback to the eNBs 104 regarding the eNB signals 150. In example embodiments, the PUCCH may be in accordance with one or more specifications such as 3GPP LTE specification.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101 and routes data packets between the RAN 101 and the core network 120. In addition, it may be a local mobility anchor point for inter-eNB handovers and may also provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the core network 120 (an EPC network here) and the communications network 164. The PDN GW 126 may be a key node for policy enforcement and charging data collection. It may also provide an anchor point for mobility with non-LTE access. The communications network 164 can be any kind of Internet Protocol (IP) private or public network, as well as an IP Multimedia Subsystem (IMS) domain, and may include the Internet. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller) functions such as radio bearer management, uplink and downlink dynamic radio resource management or control (RRC) and data packet scheduling, and mobility management. In some cases, the RRC functions are handled by another part of the network 100. In accordance with some embodiments, UEs 102 may be configured to communicate orthogonal frequency division multiplexing (OFDM) communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the core network 120, which may be an EPC network. The S1 interface 115 is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts: the X2-C and X2-U. The X2-C is the control plane interface between the eNBs 104, while the X2-U is the user plane interface between the eNBs 104.

The location server 170 may include Secure User Plane Location (SUPL) Location Platform (SPL) 174 and Evolved Serving Mobile Location Center (E-SMLC) 172. The UE 102 can communicate with the location server 170 by using a user plane (S1-U), in which case the SPL 174 handles the communications, and the communication is through the serving gateway 124, and the PDN GW 126. Moreover, the UE 102 can communicate with the location server 170 by the control plane (S1-MME), in which case the E-SMLC 172 handles the communications, and the communications is through the MME 122. In some embodiments, the location server 170 can communicate with the UE 102 through the communications network 164. In example embodiments, the eNB 104 may communicate with E-SMLC 172 to provide positioning data stored at the eNB to support positioning.

Figure 2:
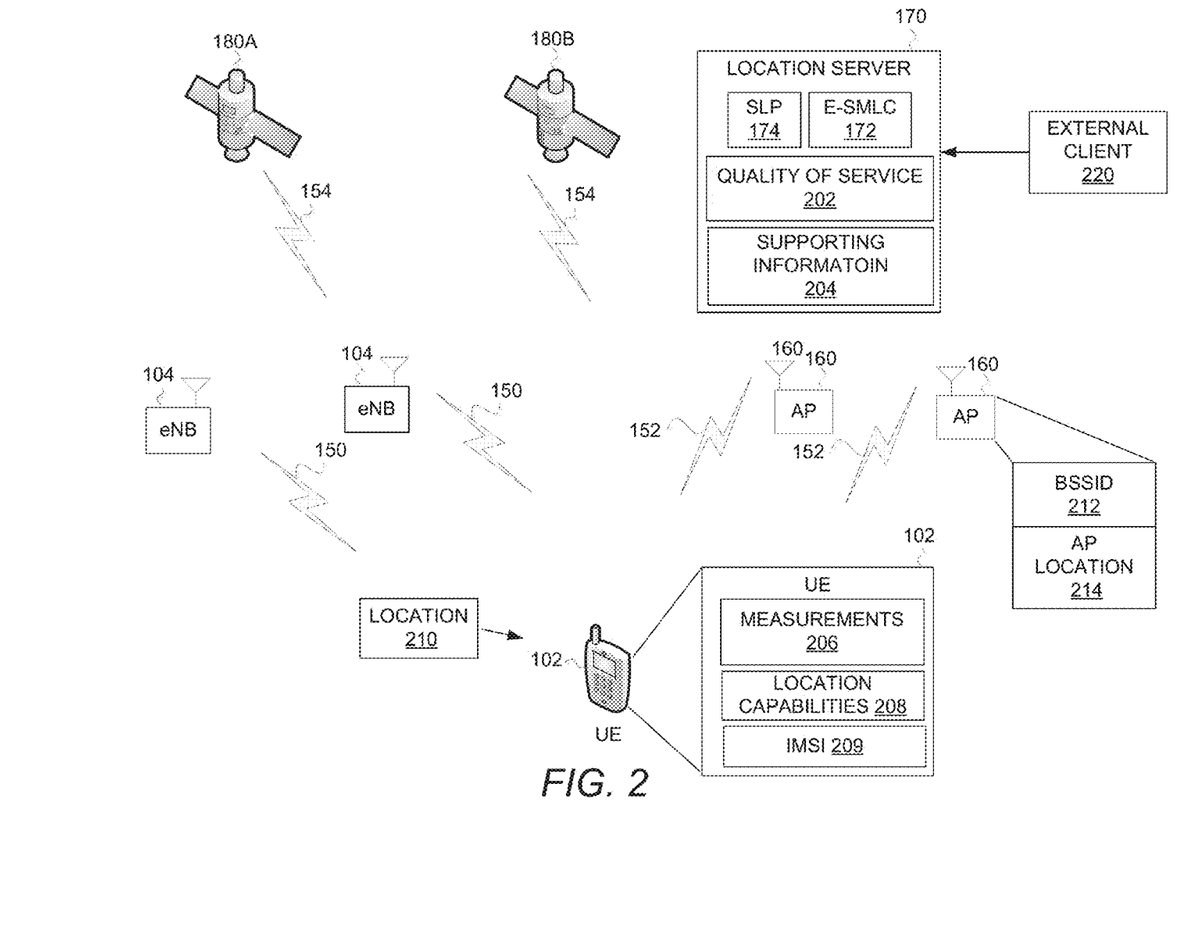
FIG. 2 illustrates signals that may be used to estimate the location of a UE 102, according to example embodiments.

The location server 170 is a network entity that collects measurement data and other location information from the UE 102 and eNB 104 and assists the UE 102 with measurements and estimates the position of the UE 102. The location server 170 may use measurements of eNB signals 150, AP signals 152, and/or satellite signals 154 (FIG. 2). The location server 170 may receive the CSI report disclosed below to determine an estimation of the location of the UE 102. The location server 170 may also use other information such as the location of APs 160 and eNBs 104 to estimate the location of the UE 102. The location server 170 may be implemented by one or more physical devices of the EPC 120.

With cellular networks, LP cells are typically used to extend coverage to indoor areas where outdoor signals do not reach well, or to add network capacity in areas with very dense phone usage, such as train stations. As used herein, the term LP eNB 104 refers to any suitable relatively low power eNB 104 for implementing a narrower cell (narrower than a macro cell) such as a femtocell, a picocell, or a micro cell.

Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a (LP) eNB 104 might be a femtocell eNB 104 if it is coupled through the PDN GW 126. Similarly, a picocell is a wireless communication system typically covering a small area, such as in-building (offices, shopping malls, train stations, etc.) or, more recently, in-aircraft. A picocell eNB can generally connect through the X2 link to another eNB such as a macro eNB through its base station controller (BSC) functionality. Thus, (LP) eNB 104 may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

The UE 102 may transmit a PUCCH, which may, in LTE, include a CSI report. In example embodiments, the PUCCH may carry uplink control information (UCI), which may include the CSI reports, Hybrid Automatic Retransmission request (HARM) ACKnowledgment/Negative ACKnowledgment (ACK/NACK), and uplink scheduling requests (SR). In LTE, the PUCCH has different formats. In example embodiments, the UE 102 is configured to generate CSI reports, which may be reports on the channel status of different eNB signals 150. The UE 102 can provide aperiodic CSI reporting using the PUCCH or periodic CSI reports using PUCCH.

The CSI report can include a channel quality indicator (CQI), a precoding matrix indicator (PMI), a precoding type indicator (PTI), and/or rank indication (RI) reporting type. The CQI can be signaled by a UE 102 to the eNodeB 104 to indicate a suitable data rate, such as a modulation and coding scheme (MCS) value, for downlink transmissions, which can be based on a measurement of the received downlink signal to interference plus noise ratio (SINR) and knowledge of the UE's 102 receiver characteristics.

The network 100 may include a WLAN 166, which may be one or more basic service sets that may include APs 160 and an access router (AR) 162. The AR 162 may be in communication with the communications network 164. The AR 162 may facilitate communications between the UEs 102 and the APs 160 with the communications network 164, which may be in communication with the EPC 120.

The UEs 102 may be configured to communicate Institute of Electrical and Electronic Engineers (IEEE) 802.11. For example, the UEs 102 may be configured to communicate using one or more of IEEE 802.11a/b/g/n/ac/ax. Some UEs 102 may be configured to work with different ones of the 802.11 protocols.

The AP 160 may be an AP using the 802.11 to transmit and receive. The AP 160 is transmitting the AP signals 152. The AP 160 may use other communications protocols as well as the 802.11 protocol. The AP 160 and eNB 104 may be implemented by some of the same hardware and may be co-located. The 802.11 protocol may include using OFDMA. The 802.11 may include using multi-user (MU) multiple-input and multiple-output (MIMO)(MU-MIMO).

The WLAN 166 may operate on a primary channel and one or more secondary channels or sub-channels. The WLAN 166 may include one or more APs 160. In accordance with embodiments, the AP 160 may communicate with one or more of the UEs 102 on one or more of the secondary channels or sub-channels or the primary channel.

The eNB 104 may be configured to receive reports of the AP signals 152 from the UE 102, to transmit a message to the UE 102 indicating which AP 160 to attach to and/or handover, and to transmit thresholds to assist UE handovers to/from eNB from/to AP.

FIG. 2 illustrates signals that may be used to estimate the location of the UE 102 according to example embodiments. Illustrated in FIG. 2 are satellites 180, eNBs 104, APs 160, location server 170, UE 102, and external client 220. The satellites 180 may be global positioning satellites that generate signals 154. The eNBs 104 may be eNBs 104 as disclosed in conjunction with FIG. 1. The APs 160 may be APs 160 as disclosed in conjunction with FIG. 1. An AP 160 may have a basic server set identification (BSSID) 212, which may identify the AP 160.

The AP 160 may have an AP location 214 which may be accessible to the location server 170. The location server 170 may include quality of service 202 and supporting information 204. The quality of service 202 may be a desired quality of service for determining the location of the UE 102. The quality of service 202 may have been received from an external entity such as an emergency services provider. The supporting information 204 may be information that assists in determining the location of the UE 102. For example, the supporting information 204 may include an initial estimate of the location of the UE 102, a list of visible satellites 180, frequencies for positioning reference signals (FIG. 3), times for beacon signals, a list of APs 160, a list of eNBs 104, carrier frequency (or AP 160 bands) with reference AP 160 transmissions, BSSID of AP 160, beacon interval, and so forth.

The UE 102 may include measurements 206, location capabilities 208, and an international mobile subscriber identity (IMSI) 209. The measurements 206 may be measurements 206 that the UE 102 takes of the eNB signals 150, AP signals 152, and satellite signals 154. Additionally, the measurements 206 may include computations regarding eNB signals 150, AP signals 152, and satellite signals 154, and other settings of the UE 102 (such as timing offsets). The IMSI 209 may be an international identification of the UE 102 that may be stored on the UE 102 and at the EPC 120 and/or E-UTRAN 101. A location 210 may be the actual location of the UE 102.

The measurements 206 taken from the AP 160 may include receive channel power indicator (RCPI), receive signal to noise indicator (RSNI), average noise power indicator (ANPI), beacon received signal strength indicator (beacon RSSI), and beacon signal to noise ratio (SNR).

RCPI may be an indication of the total channel power (signal, noise, and interference) of a received frame measured on the channel and at the antenna connector used to receive the frame. RSNI may be an indication of the signal to noise plus interference ratio of a received frame. RSNI may be defined by the ratio of the received signal power (RCPI-ANPI) to the noise plus interference power (ANPI) as measured on the channel and at the antenna connector used to receive the frame.

ANPI may be a medium access control (MAC) indication of the average noise plus interference power measured when the channel is idle as defined by three simultaneous conditions: 1) the Virtual Carrier Sense (CS) mechanism indicates idle channel, 2) the UE is not transmitting a frame, and 3) the UE 102 is not receiving a frame. RSSI may be the received signal strength in dBm of Beacon frames received on the channel. RSSI may be time averaged over recent history by a vendor-specific smoothing function. The SNR may be time-averaged over recent history by a vendor-specific smoothing function.

The location capabilities 208 may include information regarding the UE's 102 capability to measure signals from and/or attach to APs 160 and eNBs 104. The UE 102 and location server 170 may be configured to determine a location of the UE 102. LTE based location services may include Global Navigation Satellite Systems (GNSS), observed Time Difference of Arrival (OTDOA), and Enhanced Cell ID (ECID).

The UE 102 and location server 170 may be configured for two types of GNSS. In the first type, the UE 102 may be a complete satellite receiver and be able to determine an estimate of the location 120. The location server 170 may send supporting information 204 such as an initial position estimation of the UE 102 and a list of visible satellites 180. In the second type, assisted-GNSS (A-GNSS), the UE 102 is a basic satellite receiver and sends the measurements 206 of the satellite signals 154 to the location server 170, which determines an estimate location 210 of the UE 102. The measurement accuracy of the estimate location 210 may be about 10 meters. GNSS may be limited because the UE 102 may be surrounded by tall buildings or be inside and unable to receive the satellite signals 154.

Figure 3:
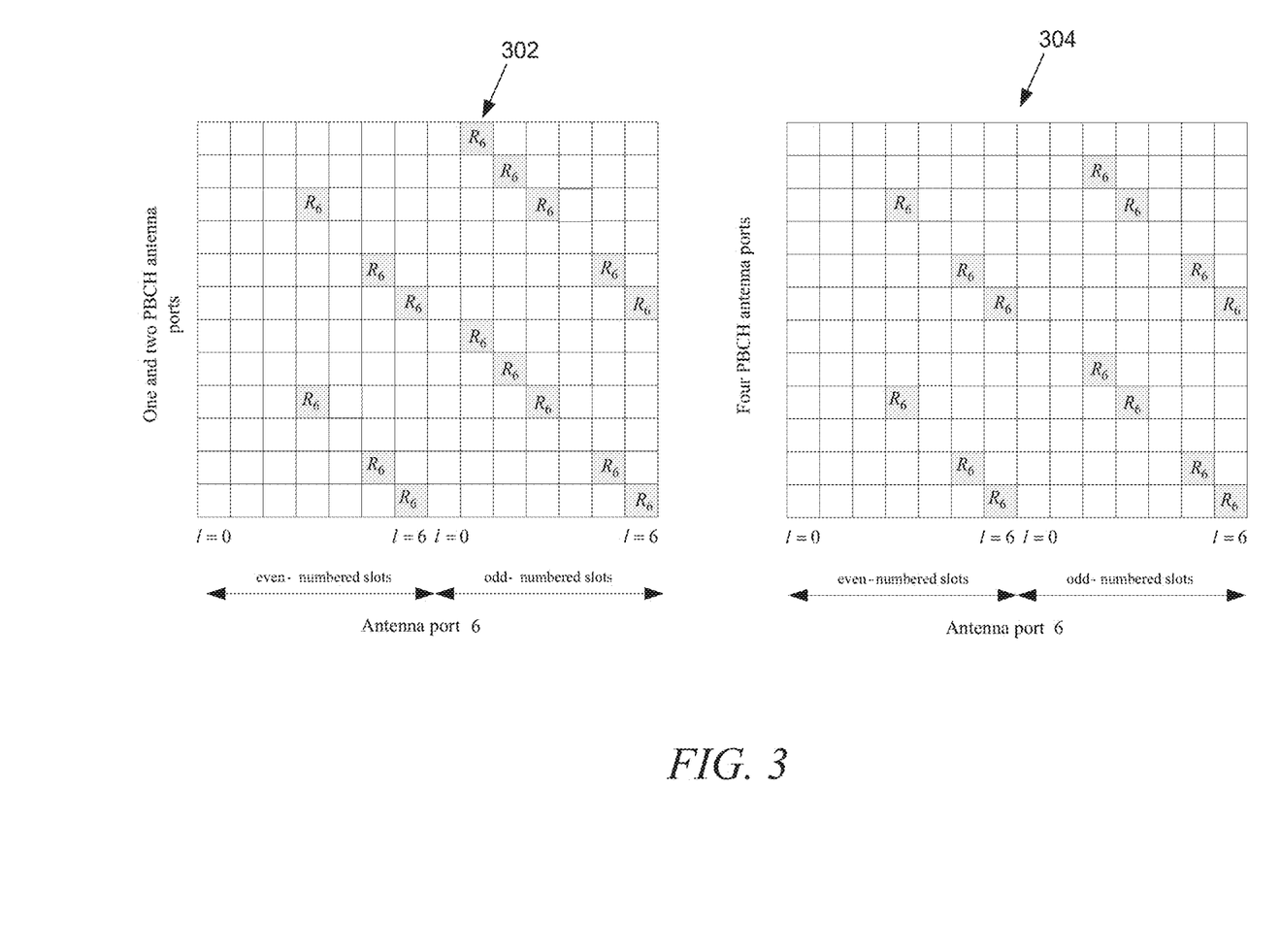
FIG. 3 illustrates position reference signals for normal cyclic prefix.

In OTDOA, the UE 102 measures the times at which signals arrive from at least two eNBs 104, of which one is the serving cell of the UE 102. FIG. 3 illustrates position reference signals 302 for normal cyclic prefix. The UE 102 measures the times at which the position reference signals arrive from an eNB 104 that is its serving cell and from at least one other nearby eNB 104. The UE 102 reports the measurements 206 or the time differences to the location server 170, which may then determine an estimate of the location 210 of the UE 102 using triangulation. OTDOA is limited by multipath. The estimate of the location 210 is typically accurate to around 100 meters.

The UE 102 and location server 170 may be configured for three different types of ECID. A first ECID type of estimating the distance from a single eNB 104, a second ECID type of measuring the distance from three eNBs 104, and a third type of measuring the angle-of-arrival (AoA) from at least two eNBs 104. In the first and second types, the UE 102 takes measurements 206 based on reference signal received power (RSRP), timing advance (TADV), or round trip time (RTT) estimates. In the third type, the measurements 206 are taken directly by the eNB 104 to which the UE 102 may be attached.

Additionally, the UE 102 and location server 170 may be configured for enhanced ECID where the AP signals 152 are used to determine an estimate of the location 210 of the UE 102. In example embodiments, the UE 102 and location server 170 may determine an estimate of the location 210 of the UE 102 using the AP signals 152 in conjunction with one or more of the methods described above. In example embodiments, the UE 102 and location server 170 may determine an estimate of the location 210 of the UE 102 using the AP signals 152, the satellite signals 154, and/or the eNB signals 150.

In example embodiments, the location server 170 may determine an estimate of the location 210 of the UE 102 using measurements 206 and the AP location 214 of one or more APs 160. The external client 220 may be a client that requests the location 210 of the UE 102. For example, the external client 220 may be a 911 service.

FIG. 3 illustrates the time-frequency positions of the positioning reference signals (PRS) in the resource block used by the UE 102 for the location measurements in LTE. Two PRS patterns 302, 304 are illustrated corresponding to LTE system transmitting cell-specific reference signal (CRS) with 1,2 antenna ports (PRS pattern 302) and 4 antenna ports (PRS pattern 304). The resource elements allocated for PRS transmission are marked as $R_6$ and may be shifted in the frequency domain depending on the physical cell identity of the eNB 104 transmitting the PRS. The PRS are transmitted over the N with superscript PRS and subscript RB central resource blocks that are indicated to the UE 102 via higher-layer signaling, which may occupy the entire system bandwidth.

Figure 4:
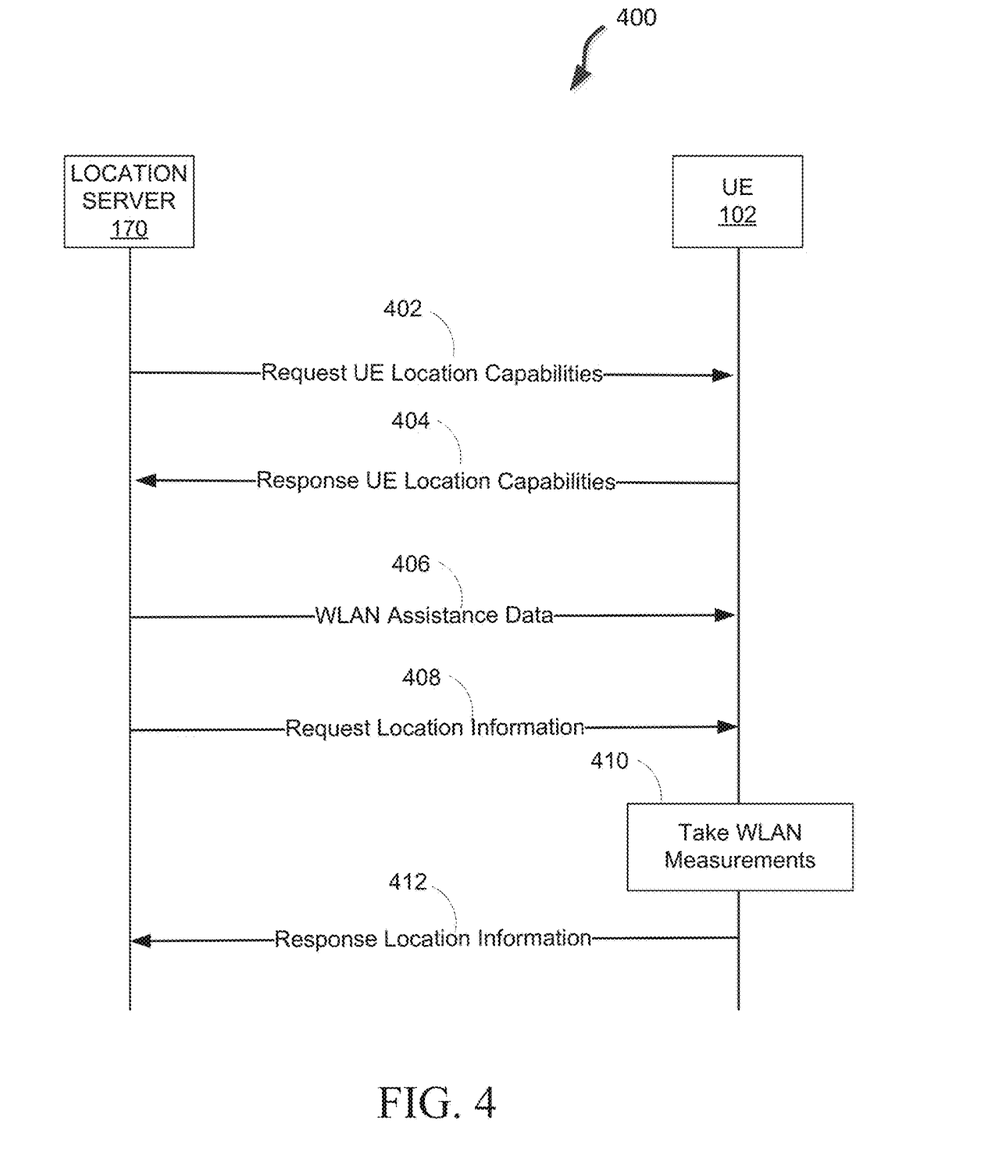
FIG. 4 illustrates a method of determining the location of a UE, according to example embodiments.

FIG. 4 illustrates a method of determining the location of a UE according to example embodiments. The method 400 begins at operation 402 with requesting UE location capabilities. For example, the location server 170 may request the location capabilities 208 of the UE 102. The location capabilities 208 may be stored in the in EPC 120 or the eNB 104 and returned to the location server 170. Alternatively, the location capabilities 208 may be stored at the UE 102. The method 400 continues at operation 404 with the UE responding to the UE location capabilities request. The request from the location server 170 may come from the location server 170 through either an AP 160 or eNB 104.

The method 400 may continue at operation 406 with the location server 170 sending WLAN assistance data to the UE 102. For example, the WLAN assistance data may include supporting information 204 such as one or more of a WLAN carrier frequency, reference WLAN transmissions, BSSIDs of one or more APs 160, beacon interval, and so forth. The WLAN assistance data may be transmitted to the UE 102 either through the eNB 104 or the AP 160. In example embodiments, the assistance data is a list of APs 160, which may optionally include other information regarding the APs 160 such as a frequency or beacon interval. The WLAN assistance data may be determined based on the location capabilities 208. For example, the location capabilities 208 may indicate which protocols that the UE 102 can attach to or measure the signals of, and the location server 170 may select the APs 106 and/or eNBs 104 based on which AP 106 and/or eNBs 104 the UE 102 can attach to and/or measure the signals of.

The method 400 may continue at operation 408 with requesting location information. The location server 170 may send a request for location information to the UE 102. The request may be transmitted to the UE 102 either through the eNB 104 or the AP 106.

The method 400 may continue at operation 410 with taking WLAN measurements. For example, the UE 102 may take measurements 206 from AP signals 152. The measurements 206 may include one or more of RCPI, RSNI, ANPI, RSSI, SNR, or another measurement.

The method 400 may continue at operation 412 with responding to location information. For example, the UE 102 may send the measurements 206 to the location server 170. The measurements 206 may be sent through the eNB 104 or the AP 160. The location server 170 may then determine a location of the UE 102. The location server 170 may combine the results of the determination with one or more other methods of determining the location of the UE such as GNSS, OTDOA, or one of the types of ECID. In example embodiments, the method 400 may end.

Figure 5:
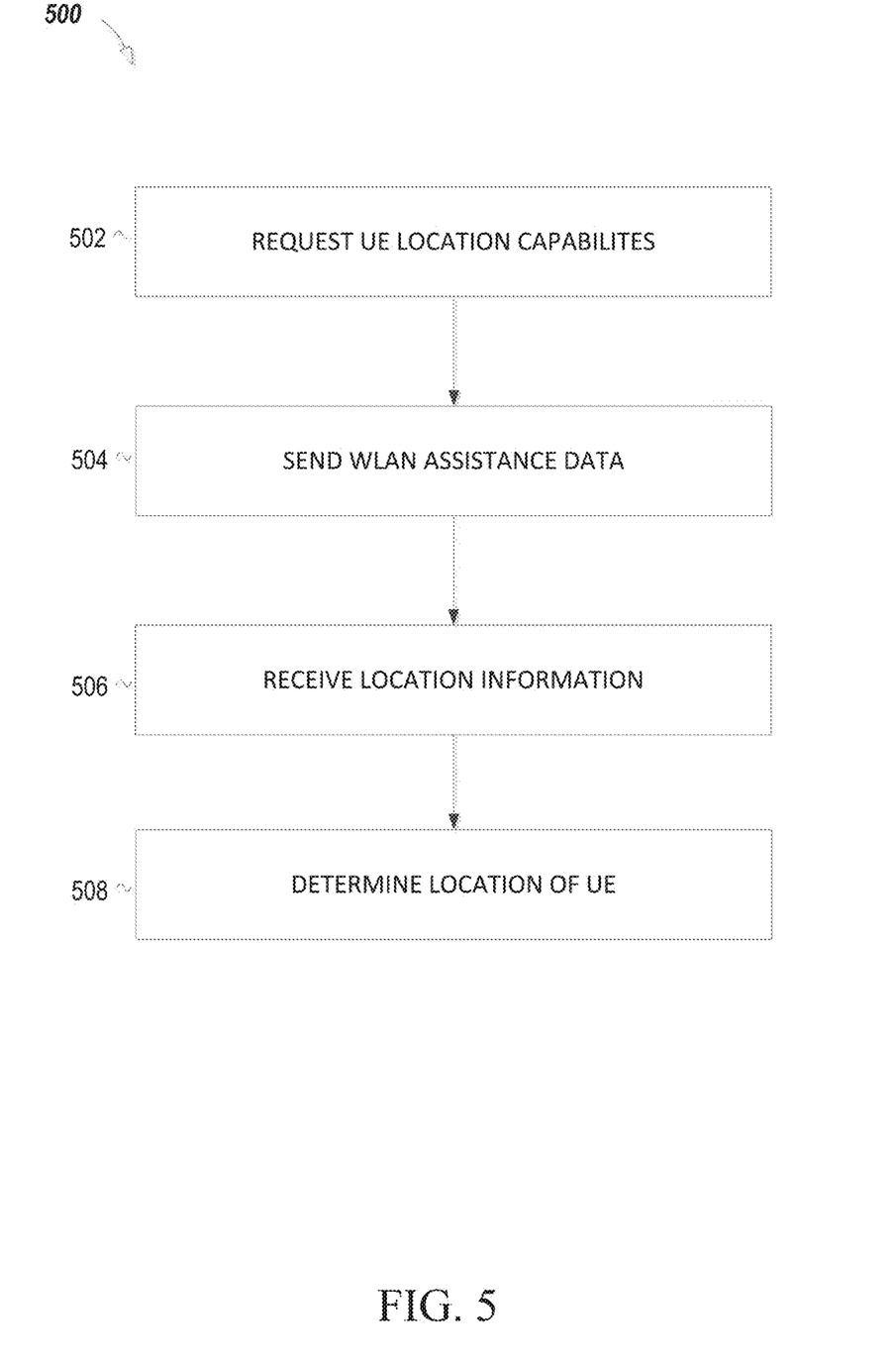
FIG. 5 illustrates a method of determining a location of a UE, according to example embodiments.

FIG. 5 illustrates a method of determining a location of a UE, according to example embodiments. The method 500 starts at operation 502 with requesting UE capabilities. For example, the location server 170 may request the UE location capabilities 208. The location server 170 may request the UE location capabilities 208 from a EPC 120 or E-UTRAN entity. For example, the location server 170 may request the UE location capabilities 208 from an eNB 104 that may be the serving eNB 104 of the UE 102. The location server 170 may have received a request for the location of the UE 102 from an external client 220 such as a 911 client. The location server 170 may request from a home subscriber server an identity of a MME 122 serving the UE 102 and may receive the identity of the MME 122 serving the UE 102 and the IMSI 209 of the UE 102. In example embodiments, the location server 170 may be able to retrieve the UE location capabilities 208 from the serving MME 122 or the serving eNB 104.

The method 500 continues at operation 504 with sending the WLAN assistance data. For example, the location server 170 may send supporting information 204 to the UE 102. The location server 170 may first select the appropriate supporting information 204 to send to the UE 102 based on the UE location capabilities 208. The supporting information 204 may include a list of one or more APs 160 for the UE 102 take measurements 206 of the signals.

The method 500 continues at operation 506 with receiving location information. For example, the UE 102 may receive the supporting information 204 and take the measurements 206 and then send the measurements 206 to the location server 170. In example embodiments, the UE 102 may send the measurements 206 through either the AP 160 or the eNB 104.

The method 500 continues at operation 508 with determining location of the UE. For example, the location server 170 may use the measurements 206 to determine an estimate of the location 210 of the UE 102. The location server 170 may combine the measurements 206 with one or more of the methods discussed in conjunction with FIGS. 2-4 to determine an estimate of the location 210. The location server 170 may then send the estimate of the location 210 to the external client 220.

Figure 6:
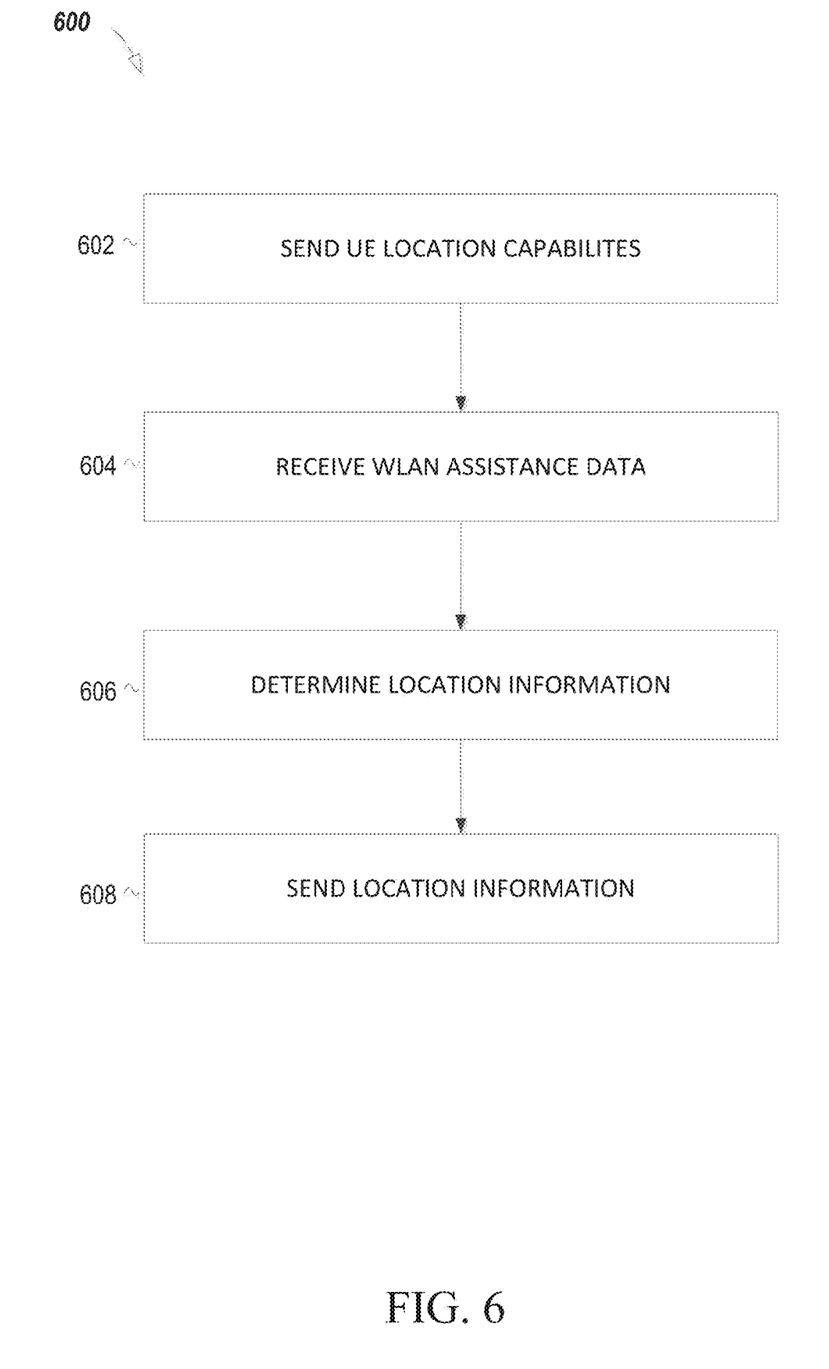
FIG. 6 illustrates a method of determining a location of a UE, according to example embodiments.

FIG. 6 illustrates a method 600 of determining a location of a UE, according to example embodiments. The method 600 may begin at operation 602 with sending UE location capabilities. For example, the UE 102 may receive a request to send the location capabilities 208 from the location server 170. The UE 102 may respond by sending the location capabilities 208.

The method 600 may continue at operation 604 with receiving WLAN assistance data. For example, the UE 102 may receive supporting information 204 from the location server 170.

The method 600 may continue at operation 606 with determining location information. For example, the UE 102 may determine the measurements 206 from the AP signals 152 based on the WLAN assistance data (which may be the supporting information 204). In example embodiments, the UE 102 may also determine measurements 206 from eNB signals 150 and/or satellite signals 154.

The method 600 may continue at operation 608 with sending location information. For example, the UE 102 may send measurements 206 to the location server 170. In example embodiments, the UE 102 may send the measurements 206 either through the AP 160 or the eNB 104.

Figure 7:
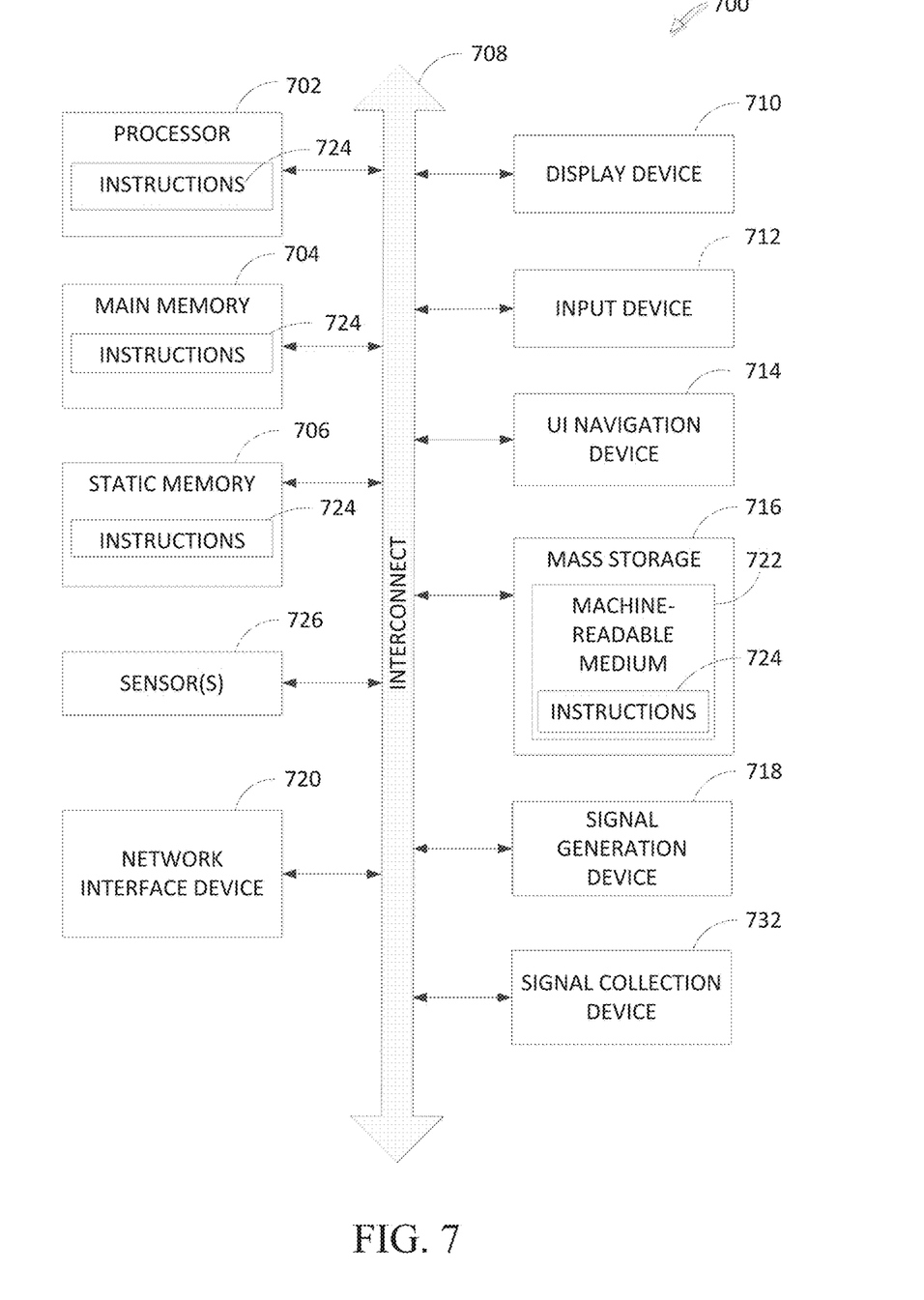
FIG. 7 illustrates a block diagram of a computer system able to perform the methods disclosed herein for the location server.

FIG. 7 illustrates a block diagram of a machine or apparatus in the example form of a computer system 700 within which instructions for causing the machine or apparatus to perform any one or more of the methods disclosed herein may be executed. For example, the computer system 700 may implement the location server 170. In a networked deployment, the computer system 700 may operate in the capacity of a server or a client machine in server-client network environment, or as a peer machine in a peer-to-peer (or distributed) network environment. The computer system 700 may be a network entity, personal computer (PC), a web appliance, a network router, switch or bridge, an edge device, a gateway, a gateway, or another machine capable of executing instructions (sequential or otherwise) that specify actions to be taken by that machine. Further, while only a single computer system is illustrated, the term "computer system" shall also be taken to include any collection of computer systems that individually or jointly execute a set (or multiple sets) of instructions to perform any one or more of the methodologies discussed herein.

The example computer system 700 includes one or more processors 702 (e.g., a central processing unit (CPU), a graphics processing unit (GPU), or both), a main memory 704, and a static memory 706, which communicate with each other via a bus 708. In example embodiments, the computer system 700 includes a display unit 710 (e.g., a liquid crystal display (LCD) or a cathode ray tube (CRT)). In example embodiments, the computer system 700 also includes an alphanumeric input device 712 (e.g., a keyboard), a user interface (UI) navigation device 714 (e.g., a mouse), mass storage 716, a signal generation device 718 (e.g., a speaker), and a network interface device 720. The network interface 720 may be configured to communicate with one or more networks such as EPC 120 or communications network 164 (see FIG. 1). The computer system 700 may include one or more sensors 726. The computer system 700 may include a signal collection device 732.

The mass storage 716 includes a machine-readable medium 722 on which is stored one or more sets of instructions and data structures (e.g., software) 724 embodying or used by any one or more of the methods or functions described herein such as implementing the location server 170 including method 500.

The instructions 724 may be modules. The instructions 724 may also reside, completely or at least partially, within the main memory 704, static memory 706, and/or within the one or more processors 702 during execution thereof by the computer system 700, with the main memory 704 and the one or more processors 702 also constituting machine-readable media. The instructions 724 may be implemented in a hardware module.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and compact disk read only memory (CD-ROM) and digital video disc-read only memory (DVD-ROM) disks.

The instructions 724 may further be transmitted or received over a communications network using a transmission medium. The instructions 724 may be transmitted or received using the network interface device 720 and any one of a number of well-known transfer protocols (e.g., hypertext mark-up protocol (HTTP)). Examples of communication networks include a local area network (LAN), a wide-area network (WAN), LTE, the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Figure 8:
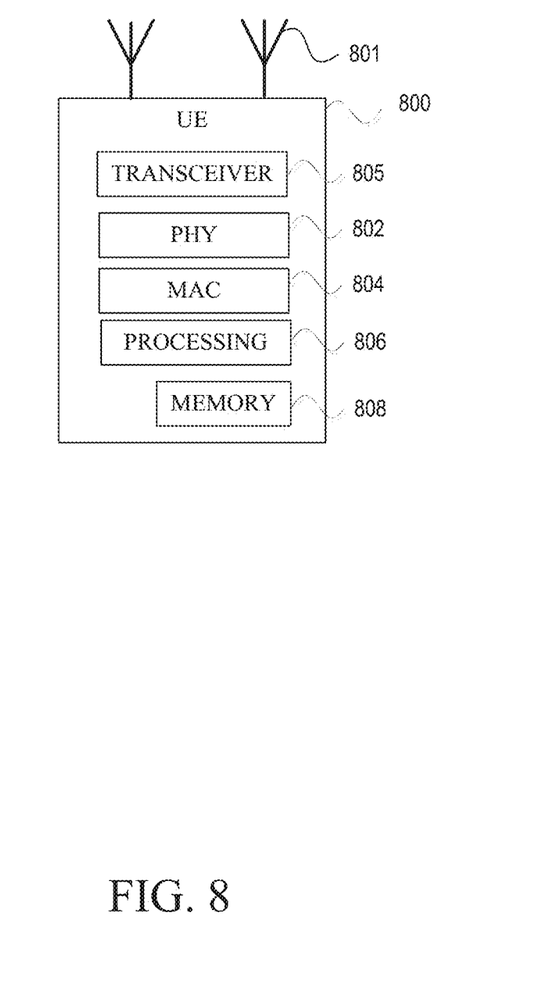
FIG. 8 illustrates a block diagram of a UE, in accordance to example embodiments.
Figure 9:
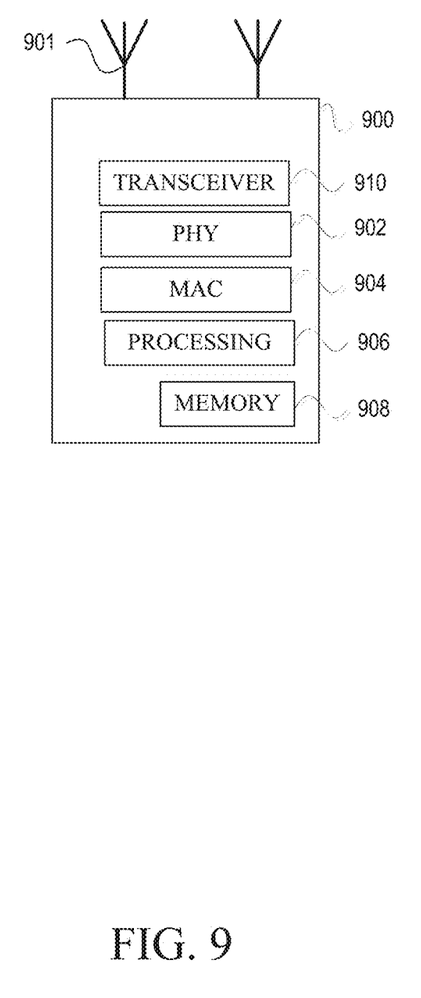
FIG. 9 illustrates a block diagram of an eNB or AP, in accordance with some embodiments.

FIG. 8 illustrates a block diagram of a UE 800, in accordance to example embodiments. FIG. 9 illustrates a block diagram of an eNB or AP 900, in accordance with some embodiments. It should be noted that in some embodiments, the eNB or AP 900 may be a stationary non-mobile device. The UE 800 may be a UE 102 as depicted in FIG. 1, while the eNB or AP 900 may be an eNB 104 or AP 160 as depicted in FIG. 1. The UE 800 may include physical layer circuitry (PHY) 802 for transmitting and receiving signals to and from the eNB or AP 900, other eNBs, other APs, other UEs, or other devices using one or more antennas 801, while the eNB or AP 900 may include physical layer circuitry (PHY) 902 for transmitting and receiving signals to and from the UE 800, other eNBs, other APs, other UEs, or other devices using one or more antennas 901. The UE 800 may also include MAC layer circuitry 804 for controlling access to the wireless medium, while the eNB or AP 900 may also include MAC layer circuitry 904 for controlling access to the wireless medium. The UE 800 may also include processing circuitry 806 and memory 808 arranged to perform the operations described herein, and the eNB or AP 900 may also include processing circuitry 906 and memory 808 arranged to perform the operations described herein. The UE 800 may include a transceiver 805 for controlling the antenna 801, while the eNB or AP 900 may include a transceiver 910 for controlling the antenna 901.

The antennas 801, 901 may comprise one or more directional or omnidirectional antennas, including, for example, dipole antennas, monopole antennas, patch antennas, loop antennas, microstrip antennas, or other types of antennas suitable for transmission of radio frequency (RF) signals. In some MIMO embodiments, the antennas 801, 901 may be effectively separated to take advantage of spatial diversity and the different channel characteristics that may result.

Although the UE 800 and eNB or AP 900 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In some embodiments, the UE 800 may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, or wearable device etc.), or other device that may receive and/or transmit information wirelessly. In some embodiments, the UE 800 may include one or more of a keyboard, a display, a non-volatile memory port, multiple antennas, a graphics processor, an application processor, speakers, and other mobile device elements. The display may be an LCD screen including a touch screen.

In accordance with embodiments, the UE 800 and eNB or AP 900 may be configured for one or more of the example embodiments described herein for determining an estimate of a location of an AP 900.

The following examples pertain to further embodiments. Example 1 is a wireless communication network entity. The network entity may include one or more processors configured to send wireless local area network (WLAN) assistance data to a user equipment (UE). The WLAN assistance data may include a list of one or more WLAN access points (APs). The one or more processors may be further configured to receive location information from the UE. The location information is based on measurements of signals from one or more of the WLAN APs of the list of one or more WLAN APs. The one or more processor may be configured to determine an estimate of the location of the UE based on the location information.

In Example 2, the subject matter of Example 1 can optionally include wherein each of the list of one or more WLAN APs may be identified by a basic service set identifier (BSSID).

In Example 3, the subject matter of Examples 1 or 2 can optionally include where the list of one or more WLAN APs may include for at least one AP, at least one from the following group: one or more frequency channels and a beacon time interval.

In Example 4, the subject matter of any of Examples 1-3 can optionally include where the WLAN assistance data further comprises an initial estimate of the location of the UE, and where the initial estimate of the location of the UE may be determined based on one from the following group: Global Navigation Satellite Systems (GNSS), observed Time Difference of Arrival (OTDOA), and Enhanced Cell ID (ECID).

In Example 5, the subject matter of any of Examples 1-4 can optionally include where the location information includes measurements of the signals of the one or more WLAN APs of the list of one or more WLAN APs.

In Example 6, the subject matter of Example 5 can optionally include where the measurements of the signals of the one or more WLAN APs of the list of one or more WLAN APs may include one or more from the following group: received channel power indicator (RCPI), received signal to noise indicator (RSNI), average noise power indicator (ANPI), beacon received signal strength indicator (beacon RSSI), and beacon signal to noise ratio (beacon SNR).

In Example 7, the subject matter of any of Examples 1-5 can optionally include where the one or more processors are further configured to determine the estimate of the location of the UE based on the measurements of the signals of the one or more WLAN APs of the list of one or more WLAN APs and a geographic position of each of the one or more WLAN APs.

In Example 8, the subject matter of any of Examples 1-5 can optionally include where the WLAN assistance data further comprises a list of one or more evolved NodeB (eNBs), and where the location information includes measurements of the signals of the one or more WLAN APs of the list of one or more WLAN APs and measurements of one or more eNBs of the list of one or more eNBs.

In Example 9, the subject matter of Example 8 can optionally include where the one or more processors are further configured to determine the estimate of the location of the UE based on the measurements of the signals of the one or more WLAN APs of the list of one or more WLAN APs, a geographic position of the one or more WLAN APs, measurements of the signals of the one or more eNBs of the list of one or more eNBs, and a geographic position of the one or more eNBs.

In Example 10, the subject matter of any of Examples 1-5 can optionally include where the network entity is at least one from the following group: an evolved NodeB (eNB), an Evolved Serving Location Center (E-SMLC), a Secured User Plane Location Platform (SLP), and a Long-Term Evolution (LTE) wireless communication network entity.

In Example 11, the subject matter of any of Examples 1-10 can optionally include where the one or more processors are further configured to send a request for UE location capabilities to the UE; receive a response to the request for the UE location capabilities; and determine the list of one or more WLAN APs based on which WLAN APs from which the UE can measure signals.

In Example 12, the subject matter of any of Examples 1-11 can optionally include where the one or more processors are further configured to: receive a request for a location of the UE from a 911 service; and send the estimate of the location of the UE based on the location information to the 911 service.

In Example 13, the subject matter of any of Examples 1-12 can optionally include where the WLAN assistance data to the UE is sent through a Long-Term Evolution (LTE) network and the wireless communication network entity is an LTE network entity.

In Example 14, the subject matter of any of Examples 1-13 can optionally include memory coupled to the one or more processors.

In Example 15, the subject matter of Example 14 can optionally include one or more network interfaces coupled to the one or more processors.

Example 16 is a method performed by a network entity. The method may include sending wireless local area network (WLAN) assistance data to a user equipment (UE). The WLAN assistance data may include a list of one or more WLAN access points (APs). The method may include receiving location information from the UE comprising measurements of signals of WLAN APs from the list of one or more WLAN APs. The method may include determining an estimate of the location of the UE based on the measurements of signals of the WLAN APs of the list of one or more WLAN APs, and a geographic position of the WLAN APs of the list of one or more WLAN APs.

In Example 17, the subject matter of Example 16 can optionally include where the WLAN assistance data further includes a list of one or more evolved NodeB (eNBs), and receiving further includes receiving from the UE location information comprising measurements of signals of eNBs from the list of one or more evolved eNBs. Determining may include determining the estimate of the location of the UE based on the measurements of the signals of the WLAN APs of the list of one or more WLAN APs, a geographic position of the WLAN APs of the one or more WLAN APs, measurements of the signals of the eNBs of the list of one or more eNBs, and a geographic position of the eNBs of the one or more eNBs.

In Example 18, the subject matter of Example 16 can optionally include where the measurements of the signals of the WLAN APs of the list of one or more WLAN APs includes one or more from the following group: received channel power indicator (RCPI), received signal to noise indicator (RSNI), average noise power indicator (ANPI), beacon received signal strength indicator (beacon RSSI), and beacon signal to noise ratio (beacon SNR).

In Example 19, the subject matter of any of Examples 16-18 can optionally include where the network entity is at least one from the following group: an evolved NodeB (eNB), an Evolved Serving Location Center (E-SMLC), a Secured User Plane Location Platform (SLP), and a Long-Term Evolution (LTE) wireless communication network entity.

Example 20 is user equipment (UE). The UE may include circuitry configured to send UE location capabilities to a network entity; receive wireless local-area network (WLAN) assistance data from the network entity. The WLAN assistance data may include a list of one or more WLAN access points (APs). The circuitry may be further configured to measure signals of WLAN APs of the list of one or more WLAN APs included in the assistance data, and determine location information based on the signals of the WLAN APs of the list of one or more WLAN APs. The circuitry may be further configured to send the location information to the network entity.

In Example 21, the subject matter of Example 20 can optionally include where the WLAN assistance data is received through a Long-Term Evolution (LTE) network, and the network entity is a LTE network entity; and wherein the APs are identified by a basic service set identifier (BSSID).

In Example 22, the subject matter of Examples 20 or 21 can optionally include memory coupled to the circuitry, and one or more antennas configured to communicate using a wireless communication protocol and a Institute for Electrical and Electronic Engineers (IEEE) 802.11 protocol. The one or more antennas may be coupled to the circuitry.

In Example 23, the subject matter of any of Examples 20-22 can optionally include one from the following group: determine the location information to be an estimate of the location of the UE based on the measurements of the signals of the WLAN APs from the list of one or more WLAN APs and a geographic position of the WLAN APs of the one or more WLAN APs; and determine the location information to be the measured signals of the WLAN APs of the list of one or more WLAN APs included in the assistance data.

Example 24 is a non-transitory computer-readable storage medium that stores instructions for execution by one or more processors to perform operations. The operations are to configure the one or more processors to cause the wireless communication device to: send wireless local area network (WLAN) assistance data to a user equipment (UE), the UE configured to operate with both Institute for Electrical and Electronic Engineers (IEEE) 802.11 and Long-Term Evolution wireless protocols; receive from the UE location information, the location information based on the WLAN assistance data; and determine an estimate of the location of the UE based on the location information.

In Example 25, the subject matter of Example 24 can optionally include where the WLAN assistance data comprises a list of one or more WLAN access points (APs) identified by a basic service set identifier (BSSID). The location information may include measurements of the signals of the WLAN APs of the list of one or more WLAN APs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless communication network entity, the apparatus comprising: memory; and one or more processors coupled to the memory, the one or more processors configured to:
   in response to receiving a request for a location of a user equipment (UE) from a 911 service send wireless local area network (WLAN) assistance data to the UE, wherein the WLAN assistance data comprises a list of one or more WLAN access points (APs);
   receive location information from the UE, wherein the location information is based on measurements of signals from one or more of the WLAN APs of the list of one or more WLAN APs, wherein the measurements of the signals include one or more from the following group: received channel power indicator (RCPI), received signal to noise indicator (RSNI), and average noise power indicator (ANPI);
   determine an estimate of the location of the UE based on the location information; and
   send the estimate of the location of the UE based on the location information to the 911 service.

2. The apparatus of claim 1, wherein each of the list of one or more WLAN APs are identified by a basic service set identifier (BSSID).

3. The apparatus of claim 1, wherein the list of one or more WLAN APs further comprises, for at least one AP, at least one from the following group:
   one or more frequency channels and a beacon time interval.

4. The apparatus of claim 1, wherein the WLAN assistance data further comprises an initial estimate of the location of the UE; and
   wherein the initial estimate of the location of the UE is determined based on one from the following group:
   Global Navigation Satellite Systems (GNSS), observed Time Difference of Arrival (OTDOA), and Enhanced Cell ID (ECID).

5. The apparatus of claim 1, wherein the location information includes measurements of the signals of the one or more WLAN APs of the list of one or more WLAN APs.

6. The apparatus of claim 1, wherein the one or more processors are further configured to:
   determine the estimate of the location of the UE based on the measurements of the signals of the one or more WLAN APs of the list of one or more WLAN APs and a geographic position of each of the one or more WLAN APs.

7. The apparatus of claim 1, wherein the WLAN assistance data further comprises a list of one or more evolved NodeB (eNBs); and
wherein the location information includes measurements of the signals of the one or more WLAN APs of the list of one or more WLAN APs and measurements of one or more eNBs of a list of one or more eNBs.

8. The apparatus of claim 7, wherein the one or more processors are further configured to:
determine the estimate of the location of the UE based on the measurements of the signals of the one or more WLAN APs of the list of one or more WLAN APs, a geographic position of the one or more WLAN APs, measurements of the signals of the one or more eNBs of the list of one or more eNBs, and a geographic position of the one or more eNBs.

9. The apparatus of claim 1, wherein the network entity is at least one from the following group:
an evolved NodeB (eNB), an Evolved Serving Location Center (E-SMLC), a Secured User Plane Location Platform (SLP), and a Long-Term Evolution (LTE) wireless communication network entity.

10. The apparatus of claim 1, wherein the one or more processors are further configured to:
send a request for UE location capabilities to the UE;
receive a response to the request for the UE location capabilities; and
determine the list of one or more WLAN APs based on which WLAN APs from which the UE can measure signals.

11. The apparatus of claim 1, wherein the WLAN assistance data to the UE is sent through a Long-Term Evolution (LTE) network and the wireless communication network entity is an LTE network entity.

12. The apparatus of claim 1, further comprising memory coupled to the one or more processors.

13. The apparatus of claim 12, further comprising one or more network interfaces coupled to the one or more processors.

14. A method performed by an apparatus of a network entity, the method comprising:
in response to receiving a request for a location of a user equipment (UE) from a 911 service, sending wireless local area network (WLAN) assistance data to the UE, wherein the WLAN assistance data comprises a list of one or more WLAN access points (APs);
receiving location information from the UE comprising measurements of signals of WLAN APs from the list of one or more WLAN APs;
determining an estimate of the location of the UE based on the measurements of signals of the WLAN APs of the list of one or more WLAN APs, and a geographic position of the WLAN APs of the list of one or more WLAN APs, wherein the measurements of the signals include one or more from the following group: received channel power indicator (RCPI), received signal to noise indicator (RSNI), and average noise power indicator (ANPI); and
send the estimate of the location of the UE based on the location information to the 911 service.

15. The method of claim 14, wherein the WLAN assistance data further comprises a list of one or more evolved NodeB (eNBs), and receiving further comprises receiving from the UE location information comprising measurements of signals of eNBs from the list of one or more evolved eNBs; and
wherein determining comprises:
determining the estimate of the location of the UE based on the measurements of the signals of the WLAN APs of the list of one or more WLAN APs, a geographic position of the WLAN APs of the one or more WLAN APs, measurements of the signals of the eNBs of the list of one or more eNBs, and a geographic position of the eNBs of the one or more eNBs.

16. The method of claim 15, wherein the measurements of the signals of the WLAN APs of the list of one or more WLAN APs includes one or more from the following group:
received channel power indicator (RCPI), received signal to noise indicator (RSNI), average noise power indicator (ANPI), beacon received signal strength indicator (beacon RSSI), and beacon signal to noise ratio (beacon SNR).

17. The method of claim 15, wherein the network entity is at least one from the following group:
an evolved NodeB (eNB), an Evolved Serving Location Center (E-SMLC), a Secured User Plane Location Platform (SLP), and a Long-Term Evolution (LTE) wireless communication network entity.

18. An apparatus of a user equipment (UE), the apparatus comprising: memory; and circuitry coupled to the memory, the circuitry configured to:
request 911 services;
in response to the request for 911 services, receive a request for UE capabilities from a 911 service;
send UE location capabilities to the 911 service;
receive wireless local-area network (WLAN) assistance data from the 911 service, wherein the WLAN assistance data comprises a list of one of more WLAN access points (APs);
measure signals of WLAN APs of the list of one or more WLAN APs included in the assistance data, wherein the measurements of the signals include one or more from the following group: received channel power indicator (RCPI), received signal to noise indicator (RSNI), and average noise power indicator (ANPI);
determine location information based on the signals of the WLAN APs of the list of one or more WLAN APs; and
send the location information to the 911 service.

19. The apparatus of claim 18, wherein the WLAN assistance data is received through a Long-Term Evolution (LTE) network, and the network entity is a LTE network entity; and
wherein the APs are identified by a basic service set identifier (BSSID).

20. The apparatus of claim 18, further comprising:
memory coupled to the circuitry; and
one or more antennas configured to communicate using a wireless communication protocol and a institute for Electrical and Electronic Engineers (IEEE) 802.11 protocol, wherein the one or more antennas are coupled to the circuitry.

21. The apparatus of claim 18, wherein determine further comprises one from the following group:
determine the location information to be an estimate of the location of the UE based on the measurements of the signals of the WLAN APs from the list of one or more WLAN APs and a geographic position of the WLAN APs of the one or more WLAN APs; and
determine the location information to be the measured signals of the WLAN APs of the list of one or more WLAN APs included in the assistance data.

22. A non-transitory computer-readable storage medium that stores instructions for execution by one or more processors to perform operations, the operations to configure the one or more processors to cause an apparatus of a wireless communication device to:
in response to receiving a request for a location of a user equipment (UE) from a 911 service, send wireless local area network (WLAN) assistance data to the UE, the UE configured to operate with both Institute for Electrical and Electronic Engineers (IEEE) 802.11 and Long-Term Evolution wireless protocols, wherein the WLAN assistance data comprises a list of one or more WLAN access points (APs) identified by a basic service set identifier (BSSID);
receive from the UE location information, the location information based on the WLAN assistance data, wherein the location information includes measurements of the signals of the WLAN APs of the list of one or more WLAN APs, and wherein the measurements of the signals include one or more from the following group: received channel power indicator (RCPI), received signal to noise indicator (RSNI), and average noise power indicator (ANPI);
determine an estimate of the location of the UE based on the location information; and
send the estimate of the location of the UE based on the location information to the 911 service.

* * * * *